US012754512B2

(12) United States Patent
Lee et al.

(10) Patent No.: US 12,754,512 B2
(45) Date of Patent: Oct. 6, 2026

(54) DISPLAY APPARATUS FOR OBTAINING HOLOGRAPHIC RESOURCE AND CONTROL METHOD THEREOF

(71) Applicant: SAMSUNG ELECTRONICS CO., LTD., Suwon-si (KR)

(72) Inventors: Dongho Lee, Suwon-si (KR); Jaewon Jung, Suwon-si (KR); Nakwon Choi, Suwon-si (KR); Sooyeoun Yoon, Suwon-si (KR); Jaeneung Lee, Suwon-si (KR); Jihae Lim, Suwon-si (KR); Chulyong Cho, Suwon-si (KR); Soohyun Whang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 413 days.

(21) Appl. No.: 18/214,928

(22) Filed: Jun. 27, 2023

(65) Prior Publication Data

US 2024/0069492 A1 Feb. 29, 2024

Related U.S. Application Data

(63) Continuation of application No. PCT/KR2023/007358, filed on May 30, 2023.

(30) Foreign Application Priority Data

Aug. 31, 2022 (KR) ........................ 10-2022-0110034

(51) Int. Cl.
*G03H 1/22* (2006.01)
*G03H 1/04* (2006.01)
(Continued)

(52) U.S. Cl.
CPC ......... *G03H 1/2249* (2013.01); *G03H 1/0443* (2013.01); *G06F 3/013* (2013.01); *G06F 3/04842* (2013.01); *G03H 2001/2231* (2013.01)

(58) Field of Classification Search
CPC ............... G03H 1/2249; G03H 1/0443; G03H 2001/2231; G06F 3/013; G06F 3/04842;
(Continued)

(56) References Cited

U.S. PATENT DOCUMENTS 9,736,440 B2 8/2017 Chen
10,139,721 B1 * 11/2018 Choi ...................... G02B 30/35
(Continued)

FOREIGN PATENT DOCUMENTS

CN 105929962 A 9/2016
KR 10-0926838 B1 11/2009
(Continued)

OTHER PUBLICATIONS

International Search Report (PCT/ISA/210) issued Sep. 18, 2023 by the International Searching Authority in International Patent Application No. PCT/KR2023/007358.
(Continued)

*Primary Examiner* — Vijay Shankar
(74) *Attorney, Agent, or Firm* — Sughrue Mion, PLLC

(57) ABSTRACT

A display apparatus is disclosed. The display apparatus according to the disclosure includes a display including a display panel and a plurality of reflectors that are arranged in a form of an inverted pyramid on the front surface of the display panel and reflect an image output from the display panel, a sensor, and at least one processor which identifies an object from an input image, acquires an output image including the plurality of objects based on the plurality of reflectors, and controls the display panel to display the
(Continued)

output image, wherein the processor is configured to, based on identifying a user through the sensor, update the output image based on the identified user, and control the display panel to display the updated output image.

18 Claims, 15 Drawing Sheets

(51) Int. Cl.
*G06F 3/01* (2006.01)
*G06F 3/04842* (2022.01)

(58) Field of Classification Search
CPC . G06F 3/017; G06F 3/04845; G02B 27/0093; G02B 30/56; G02B 30/60; G09F 19/125
See application file for complete search history.

(56) References Cited

U.S. PATENT DOCUMENTS

| | | | | |
|---|---|---|---|---|
| 10,401,794 | B2 | 9/2019 | Leister et al. | |
| 11,611,729 | B2 * | 3/2023 | Eder | G06F 1/169 |
| 11,837,123 | B2 | 12/2023 | Kim | |
| 12,597,219 | B2 * | 4/2026 | Rockwell | G06T 19/006 |
| 12,626,457 | B1 * | 5/2026 | McCombe | G06T 17/00 |
| 12,632,170 | B2 * | 5/2026 | Pastrana Vicente | G06F 3/04886 |
| 2012/0170089 | A1 | 7/2012 | Kim et al. | |
| 2017/0023911 | A1 * | 1/2017 | Russell | G03H 1/0443 |
| 2017/0322513 | A1 * | 11/2017 | Zapanta | G02B 5/32 |
| 2020/0236330 | A1 * | 7/2020 | Eder | G02B 30/56 |
| 2020/0372659 | A1 | 11/2020 | Hagiopol | |
| 2024/0015277 | A1 * | 1/2024 | Min | G02B 30/30 |
| 2025/0199471 | A1 * | 6/2025 | Lee | G02B 30/56 |
| 2026/0111596 | A1 * | 4/2026 | Herscher | G06F 21/6245 |

FOREIGN PATENT DOCUMENTS

| | | | |
|---|---|---|---|
| KR | 10-0929162 | B1 | 12/2009 |
| KR | 10-2011-0040206 | A | 4/2011 |
| KR | 10-1518049 | B1 | 5/2015 |
| KR | 10-1758163 | B1 | 7/2017 |
| KR | 10-1852339 | B1 | 4/2018 |
| KR | 10-1844843 | B1 | 5/2018 |
| KR | 10-2018-0091539 | A | 8/2018 |
| KR | 10-2019-0014965 | A | 2/2019 |
| KR | 10-2002383 | B1 | 7/2019 |
| KR | 10-2020-0064448 | A | 6/2020 |
| KR | 10-2234515 | B1 | 3/2021 |
| WO | 2021/080083 | A1 | 4/2021 |

OTHER PUBLICATIONS

Written Opinion (PCT/ISA/237) issued Sep. 18, 2023 by the International Searching Authority in International Patent Application No. PCT/KR2023/007358.
Communication issued on Dec. 15, 2025 by the Korean Ministry of Intellectual Property (MOIP) in Korean Patent Application No. 10-2022-0110034.
Communication dated Jul. 11, 2025, issued by the European Patent Office in European Patent Application No. 23860601.6.

* cited by examiner

DISPLAY APPARATUS FOR OBTAINING HOLOGRAPHIC RESOURCE AND CONTROL METHOD THEREOF

CROSS-REFERENCE TO RELATED APPLICATIONS

This application is a by-pass continuation of International Application No. PCT/KR2023/007358, filed on May 30, 2023, which is based on and claims priority to Korean Patent Application No. 10-2022-0110034, filed on Aug. 31, 2022 at the Korean Intellectual Property Office, the disclosures of which are incorporated by reference herein in their entireties.

BACKGROUND

1. Field

The disclosure relates to a display apparatus and a control method thereof, and more particularly, to a display apparatus obtaining a holographic resource, and a control method thereof.

2. Description of Related Art

With the development of electronic technologies, electronic apparatuses providing various functions are being developed. Recently, a display apparatus providing a hologram image by a method of making a phase formed on a reflector is being developed.

However, a display apparatus providing a hologram image has not been generalized yet, and accordingly, there is a problem that usability of such an apparatus is poor.

SUMMARY

According to an aspect of the disclosure, a display apparatus includes: a display panel; a plurality of reflectors forming an inverted pyramid on a front surface of the display panel, wherein the plurality of reflectors are configured to reflect an image output from the display panel; a sensor; at least one memory storing at least one instruction; and at least one processor configured to execute the at least one instruction to: identify an object from an input image, acquire an output image comprising a plurality of objects based on the plurality of reflectors, control the display panel to display the output image, and based on identifying a user through the sensor, update the output image and control the display panel to display the updated output image.

The at least one processor of the display apparatus may be further configured to execute the at least one instruction to: acquire the output image by arranging, within the output image, a location of each object of the plurality of objects to correspond with a location of a reflector of the plurality of reflectors, and update the output image by removing from the output image an object from the plurality of objects based on a direction corresponding to a location of the identified user.

The at least one processor of the display apparatus may be further configured to execute the at least one instruction to: acquire the output image by arranging, within the output image, a location of each object of the plurality of objects to correspond with a location of a reflector of the plurality of reflectors, based on identifying that the identified user is within a predetermined distance from the display apparatus, update the output image by removing from the output image an object from the plurality of objects based on a direction corresponding to a location of the identified user, and based on identifying that the identified user is not within the predetermined distance from the display apparatus and based on the updated output image being displayed by the display panel, acquire a re-updated output image by adding the removed object from the plurality of objects into the updated output image, and control the display panel to display the re-updated output image.

The at least one processor of the display apparatus may be further configured to execute the at least one instruction to: based on identifying that a gaze of the identified user is directed toward the display apparatus, update the output image based on a direction corresponding to a location of the identified user.

The at least one processor of the display apparatus may be further configured to execute the at least one instruction to: update the output image by changing at least one of a size and a resolution of the plurality of objects based on a distance between the identified user and the display apparatus.

The at least one processor of the display apparatus may be further configured to execute the at least one instruction to: based on a distance between the identified user and the display apparatus increasing, update the output image by enlarging a size and increasing a resolution of the plurality of objects, and based on a distance between the identified user and the display apparatus decreasing, reducing the size and decreasing the resolution of the plurality of objects.

The at least one processor of the display apparatus may be further configured to execute the at least one instruction to: based on identifying a gesture of the identified user through the sensor, update the output image by changing the location of an object corresponding to a location of the identified user, among the plurality of objects, based on a direction of the gesture.

The at least one processor of the display apparatus may be further configured to execute the at least one instruction to: identify an area of the output image that can be reflected through a reflector corresponding to the location of the identified user, among the plurality of reflectors, and based on identifying the gesture of the identified user, update the output image by changing the location of the object corresponding to the location of the identified user, among the plurality of objects, within the identified area.

The at least one processor of the display apparatus may be further configured to execute the at least one instruction to: identify a hand of the identified user through the sensor, and update the output image by rotating an object corresponding to a location of the identified user, among the plurality of objects, based on a rotational direction of the hand of the identified user.

The at least one processor of the display apparatus may be further configured to execute the at least one instruction to: identify an ambient luminance in a vicinity of the display apparatus through the sensor, and update the output image by changing a luminance of the plurality of objects based on the identified ambient luminance.

The at least one processor of the display apparatus may be further configured to execute the at least one instruction to: based on identifying a plurality of objects in the input image, identify an object among the plurality of objects identified in the input image based on the size of each object of the plurality of objects identified in the input image.

The at least one processor of the display apparatus may be further configured to execute the at least one instruction to: based on identifying a plurality of objects in the input image, acquire an output image comprising a plurality of images corresponding to the plurality of reflectors, wherein each image of the plurality of images comprises the plurality of objects identified in the input image, and control the display panel to display the output image.

The at least one processor of the display apparatus may be further configured to execute the at least one instruction to: based on receiving a user instruction selecting an object of the plurality of objects identified in the input image, control the display panel to add a focus to a rim of the selected object or cause the selected object to flicker, and based on identifying a user gesture through the sensor, update the output image by changing at least one of a location, a size, a luminance, a resolution, or a direction of the selected object based on the gesture.

The at least one processor of the display apparatus may be further configured to execute the at least one instruction to: scale the plurality of objects based on an angle formed by the plurality of reflectors and the display panel.

According to an aspect of the disclosure, a method of controlling a display apparatus includes: identifying an object from an input image; acquiring an output image comprising a plurality of objects based on the plurality of reflectors forming an inverted pyramid on a front surface of a display panel of the display apparatus, wherein the plurality of reflectors are configured to reflect an image output from the display panel; displaying the output image on the display panel; based on identifying a user, updating the output image; and displaying the updated output image on the display panel.

The acquiring the output image may include arranging, within the output image, a location of each object of the plurality of objects to correspond with a location of a reflector of the plurality of reflectors, and the updating the output image may include removing from the output image an object from the plurality of objects based on a direction corresponding to a location of the identified user.

The acquiring the output image may include arranging, within the output image, a location of each object of the plurality of objects to correspond with a location of a reflector of the plurality of reflectors, and the method of controlling the display apparatus may further include: based on identifying that the identified user is within a predetermined distance from the display apparatus, updating the output image by removing from the output image an object from the plurality of objects based on a direction corresponding to a location of the identified user; and based on identifying that the identified user is not within the predetermined distance from the display apparatus and based on the updated output image being displayed by the display panel, acquiring a re-updated output image by adding the removed object from the plurality of objects into the updated output image, and controlling the display panel to display the re-updated output image.

The method of controlling the display apparatus may further include: based on identifying that a gaze of the identified user is directed toward the display apparatus, updating the output image based on a direction corresponding to a location of the identified user.

The method of controlling the display apparatus may further include: updating the output image by changing at least one of a size and a resolution of the plurality of objects based on a distance between the identified user and the display apparatus.

According to an aspect of the disclosure, a non-transitory computer readable medium having instructions stored therein, which when executed by a processor cause the processor to execute a method of controlling a display apparatus including: identifying an object from an input image; acquiring an output image comprising a plurality of objects based on the plurality of reflectors forming an inverted pyramid on a front surface of a display panel of the display apparatus, wherein the plurality of reflectors are configured to reflect an image output from the display panel; displaying the output image on the display panel; based on identifying a user, updating the output image; and displaying the updated output image on the display panel.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
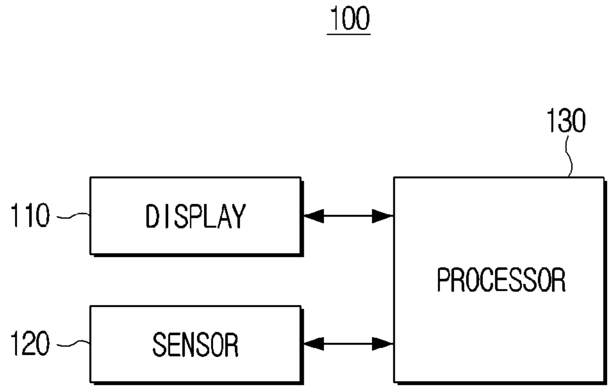
FIG. 1 is a block diagram illustrating a configuration of a display apparatus according to one or more embodiments of the disclosure.

The exemplary embodiments of the present disclosure may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail since they would obscure the disclosure with unnecessary detail.

The purpose of the disclosure is in providing a display apparatus acquiring a holographic resource based on a user, and a control method thereof.

Hereinafter, the disclosure will be described in detail with reference to the accompanying drawings.

As terms used in the embodiments of the disclosure, general terms that are currently used widely were selected as far as possible, in consideration of the functions described in the disclosure. However, the terms may vary depending on the intention of those skilled in the art who work in the pertinent field, previous court decisions, or emergence of new technologies, etc. Also, in particular cases, there may be terms that were designated by the applicant on his own, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

Also, in this specification, expressions such as "have," "may have," "include," and "may include" denote the existence of such characteristics (e.g.: elements such as numbers, functions, operations, and components), and do not exclude the existence of additional characteristics.

In addition, the expression "at least one of A and/or B" should be interpreted to mean any one of "A" or "B" or "A and B."

Further, the expressions "first," "second," and the like used in this specification may be used to describe various elements regardless of any order and/or degree of importance. Also, such expressions are used only to distinguish one element from another element, and are not intended to limit the elements.

In addition, singular expressions include plural expressions, unless defined obviously differently in the context. Further, in the disclosure, terms such as "include" and "consist of" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

Also, in this specification, the term "user" may refer to a person who uses an electronic apparatus or an apparatus using an electronic apparatus (e.g., an artificial intelligence electronic apparatus).

Hereinafter, various embodiments of the disclosure will be described in more detail with reference to the accompanying drawings.

FIG. 1 is a block diagram illustrating a configuration of a display apparatus 100 according to one or more embodiments of the disclosure.

The display apparatus 100 may be an apparatus that provides a hologram image by displaying an image, and reflecting the displayed image through at least one reflector.

According to FIG. 1, the display apparatus 100 includes a display 110, a sensor 120, and a processor 130.

The display 110 may include a display panel and a plurality of reflectors.

The display panel is a component that displays an image, and it may be implemented as display panels in various forms such as a liquid crystal display (LCD), an organic light emitting diodes (OLED) display, a plasma display panel (PDP), etc. Inside the display panel, driving circuits that may be implemented in forms such as an a-si thin film transistor (TFT), a low temperature poly silicon (LTPS) TFT, an organic TFT (OTFT), etc., a backlight unit and the like may also be included.

The plurality of reflectors may be arranged in a form of an inverted pyramid on the front surface of the display panel, and reflect an image output from the display panel. For example, the plurality of reflectors may include four reflectors in triangle shapes that are arranged in a form of an inverted pyramid.

However, the disclosure is not limited thereto, and the plurality of reflectors may include a plurality of reflectors that are arranged in a form of a poly-pyramid but not in a form of an inverted pyramid. For example, the plurality of reflectors may include three reflectors in triangle shapes that are arranged in a form of a triangular pyramid. Alternatively, the display 110 may include a display panel and one reflector arranged on the front surface of the display panel. Alternatively, the display 110 may include a display panel and a reflector in a cone shape that is arranged on the front surface of the display panel.

The plurality of reflectors may be implemented as a translucent material, and reflect an image output from the display panel. For example, each of the plurality of reflectors may reflect some of lights corresponding to an image output from the display panel and refract the others, and the user may see the image through the light reflected through one of the plurality of reflectors, and may simultaneously see the background of the rear part of one of the plurality of reflectors.

Hereinafter, for the convenience of explanation, a form wherein the plurality of reflectors are arranged in a form of an inverted pyramid on the front surface of the display panel will be described.

Arrangement of the display panel and the plurality of reflectors will be described later through the drawings.

The sensor 120 may identify a user located on at least one of the front, rear, left, and right sides of the display apparatus 100. For example, the sensor 120 may include a motion sensor, an infrared sensor, etc., and identify access of the user through the motion sensor, the infrared sensor, etc.

In an embodiment the sensor 120 may include a plurality of infrared sensors, and the plurality of infrared sensors may be arranged on the display apparatus 100 in a row and may identify the approximate location of the user located around the display apparatus 100 according to whether there is a reflected wave.

Alternatively, the sensor 120 may include a camera, a microphone, etc., and identify access of a user through the camera, the microphone, etc. Alternatively, the sensor 120 may include a camera, and identify a gesture of a user through the camera. While, in FIG. 2, the sensor 120 is illustrated as a separate component from the camera and the microphone, this is merely for the convenience of explanation.

Alternatively, the sensor 120 may include an ultrasonic sensor, a depth map, etc., and it can be any component if it is a component that can identify at least one of existence of a user or a gesture of a user.

Alternatively, the sensor 120 may include an illumination sensor, and may identify the luminance around the display apparatus 100 through the illumination sensor.

The processor 130 controls the overall operations of the display apparatus 100. Specifically, the processor 130 may be connected with each component of the display apparatus 100, and control the overall operations of the display apparatus 100. For example, the processor 130 may be connected with components such as the display 110, the sensor 120, a memory, a communication interface, etc., and control the operations of the display apparatus 100.

According to an embodiment, the processor 130 may be implemented as a digital signal processor (DSP), a microprocessor, and a time controller (TCON). However, the disclosure is not limited thereto, and the processor 130 may include one or more of a central processing unit (CPU), a micro controller unit (MCU), a micro processing unit (MPU), a controller, an application processor (AP), or a communication processor (CP), and an ARM processor, or may be defined by the terms. Also, the processor 130 may be implemented as a system on chip (SoC) having a processing algorithm stored therein or large scale integration (LSI), or in the form of a field programmable gate array (FPGA).

The processor 130 may be implemented as one processor, or implemented as a plurality of processors. However, hereinafter, the operations of the display apparatus 100 will be described with the expression "the processor 130" for the convenience of explanation.

The processor 130 may identify an object from an input image. For example, the processor 130 may identify an object based on frequency information of an input image. Alternatively, the processor 130 may identify an object from an input image through a neural network model. However, the disclosure is not limited thereto, and the processor 130 may identify an object by using various methods.

If a plurality of objects are identified from an input image, the processor 130 may identify one object based on the sizes of the plurality of objects. Alternatively, if a plurality of objects are identified from an input image, the processor 130 may identify an object having the highest sharpness among the plurality of objects.

The processor 130 may acquire (i.e., generate) an output image including a plurality of objects based on the plurality of reflectors. For example, in case where the plurality of reflectors include four reflectors in triangle shapes that are arranged in a form of an inverted pyramid, the processor 130 may acquire an output image including the four identified objects. Here, the processor 130 may acquire an output image so that objects are arranged in locations corresponding to each of the plurality of reflectors. For example, the processor 130 may acquire an output image so that four objects are respectively arranged in locations corresponding to four reflectors. Here, the output image may be a kind of holographic resource. That is, the output image may be a holographic resource output by the display panel for providing a hologram image to the user.

The output image may include an object area including a plurality of objects and a background area which is the remaining area excluding the object area. Here, the processor 130 may acquire an output image wherein the background area is black. However, the disclosure is not limited thereto, and the background area may be of a different color, or it may be a background image in a form having no directivity.

The processor 130 may control the display panel to display the output image. In this case, the user may see an image which is the output image that was output from the display panel and reflected through the plurality of reflectors in the surroundings of the display apparatus 100.

When a user is identified through the sensor 120, the processor 130 may update the output image based on the identified user, and control the display panel to display the updated output image. For example, the processor 130 may update the output image by removing one of a plurality of objects included in the output image based on the direction wherein the user was identified. For example, the processor 130 may update the output image by identifying a second reflector arranged in a location that is in symmetry with a first reflector arranged in the direction wherein the user was identified among the plurality of reflectors, and removing the object corresponding to the second reflector. Here, the processor 130 may remove the object, and then update the area of the removed object to the same color as the background.

If the object corresponding to the second reflector is not removed, the user may see the object reflected through the first reflector and the object reflected through the second reflector, and as the object reflected through the first reflector and the object reflected through the second reflector are in symmetry with each other, visibility for the user may be degraded. This is because the first reflector is translucent. Accordingly, if the object corresponding to the second reflector is removed, the user may see only the object reflected through the first reflector, and thus visibility for the user can be improved.

In the above, it was described that the processor 130 acquires an output image, and when a user is identified, updates the output image based on the identified user. However, the disclosure is not limited thereto. For example, a user may be identified before the processor 130 acquires an output image, and in this case, the processor 130 may acquire an output image including a plurality of objects based on the plurality of reflectors and the identified user. Here, if the shapes of the objects and the location of the user are identical, the updated output image that was acquired in the case of the former and the output image acquired in the case of the latter may be identical.

If a user is identified within a predetermined distance from the display apparatus 100, the processor 130 may update the output image by removing one of the plurality of objects included in the output image based on the direction wherein the user was identified, control the display panel to display the updated output image, and if the user is not identified within the predetermined distance from the display apparatus 100 while the updated output image is being displayed, re-update the updated output image by adding the removed object in the updated output image, and control the display panel to display the re-updated output image. That is, the processor 130 may remove one of the plurality of objects only when a user accessed the display apparatus 100 and the user was identified within the predetermined distance from the display apparatus 100, and add the object that was removed again only when the user moves away from the display apparatus 100.

However, the disclosure is not limited thereto, and if it is identified that the gaze of the identified user is toward the display apparatus 100, the processor 130 may update the output image based on the direction wherein the user was identified. That is, the processor 130 may remove one of the plurality of objects only when the user gazes toward the display apparatus 100.

The processor 130 may update the output image by changing at least one of the sizes or the resolutions of the plurality of objects included in the output image based on the distance between the user and the display apparatus 100.

For example, the processor 130 may update the output image by, if the distance increases, enlarging the sizes and increasing the resolutions of the plurality of objects included in the output image, and if the distance decreases, reducing the sizes and decreasing the resolutions of the plurality of objects included in the output image. Through such operations, visibility for the user can be improved.

If a swipe gesture or a gesture of moving after a grab of the user is identified through the sensor 120, the processor 130 may update the output image by changing the location of an object corresponding to the location of the user among the plurality of objects included in the output image based on the direction of the gesture.

Here, the processor 130 may identify an area of the output image that can be reflected through a reflector corresponding to the location of the user among the plurality of reflectors, and if the swipe gesture or the gesture of moving after a grab is identified, the processor 130 may update the output image by changing the location of the object corresponding to the location of the user within the identified area. That is, the processor 130 may prevent a case wherein a part of the object is not reflected due to a gesture of the user.

The processor 130 may identify the user's two hands through the sensor 120, and update the output image by rotating the object corresponding to the location of the user among the plurality of objects included in the output image based on the rotating direction of the two hands.

The processor 130 may identify the luminance around the display apparatus 100 through the sensor 120, and update the output image by changing the luminance of the plurality of objects included in the output image based on the identified luminance.

Alternatively, the processor 130 may update the output image by changing the luminance of the object included in the output image based on the location of the user. For example, if it is identified that the user accesses the display apparatus 100, the processor 130 may increase the luminance of the object corresponding to the location of the user among the plurality of objects included in the output image, and if it is identified that the user moves away from the display apparatus 100, the processor 130 may decrease the luminance of the object corresponding to the location of the user among the plurality of objects included in the output image.

If a plurality of objects are identified from an input image, the processor 130 may acquire an output image including a plurality of images including the plurality of objects based on the plurality of reflectors, and control the display panel to display the output image.

In this case, if a user instruction selecting one of the plurality of objects is received, the processor 130 may control the display panel to add a focus to a rim of an object corresponding to the user instruction among the plurality of objects or flicker the object corresponding to the user instruction, and if the user's gesture is identified through the sensor 120, the processor 130 may update the output image by changing at least one of the location, the size, the luminance, the resolution, or the direction of the object corresponding to the user instruction based on the gesture.

The processor 130 may scale the plurality of objects included in the output image based on an angle formed by the plurality of reflectors and the display panel.

The display apparatus 100 may further include a housing which is implemented as a hexahedron, and of which inside can be seen through, and the display panel may be arranged on the lower surface of the hexahedron and may output an image to the upper side, or may be arranged on the upper surface of the hexahedron and may output an image to the lower side, and the plurality of reflectors may be arranged inside the housing.

Meanwhile, functions related to artificial intelligence according to the disclosure may be operated through the processor 130 and the memory.

The processor 130 may consist of one or a plurality of processors. Here, the one or plurality of processors may be generic-purpose processors such as a CPU, an AP, a DSP, etc., graphics-dedicated processors such as a GPU and a vision processing unit (VPU), or artificial intelligence-dedicated processors such as an NPU.

The one or plurality of processors perform control so that input data is processed according to a predefined operation rule or an artificial intelligence model stored in the memory. Alternatively, in an embodiment where the one or plurality of processors are artificial intelligence-dedicated processors, the artificial intelligence-dedicated processors may be designed as a hardware structure specified for processing of a specific artificial intelligence model. The predefined operation rule or the artificial intelligence model are characterized in that they are made through learning.

Here, being "made through learning" means that a basic artificial intelligence model is trained by using a plurality of learning data by a learning algorithm, and a predefined operation rule or an artificial intelligence model set to perform a desired characteristic (or, purpose) is made. Such learning may be performed in an apparatus wherein artificial intelligence is performed itself according to the disclosure, or performed through a separate server and/or system. As examples of learning algorithms, there are supervised learning, unsupervised learning, semi-supervised learning, or reinforcement learning, but learning algorithms are not limited to the aforementioned examples.

An artificial intelligence model may consist of a plurality of neural network layers. Each of the plurality of neural network layers has a plurality of weight values, and performs a neural network operation through the operation result of the previous layer and an operation among the plurality of weight values. The plurality of weight values included by the plurality of neural network layers may be optimized by the learning result of the artificial intelligence model. For example, the plurality of weight values may be updated so that a loss value or a cost value acquired at the artificial intelligence model during a learning process is reduced or minimized.

An artificial neural network may include a deep neural network (DNN), and there are, for example, a convolutional neural network (CNN), a deep neural network (DNN), a recurrent neural network (RNN), a restricted Boltzmann Machine (RBM), a deep belief network (DBN), a bidirectional recurrent deep neural network (BRDNN), a generative adversarial network (GAN), or Deep Q-networks, etc., but the disclosure is not limited to the aforementioned examples.

Figure 2:
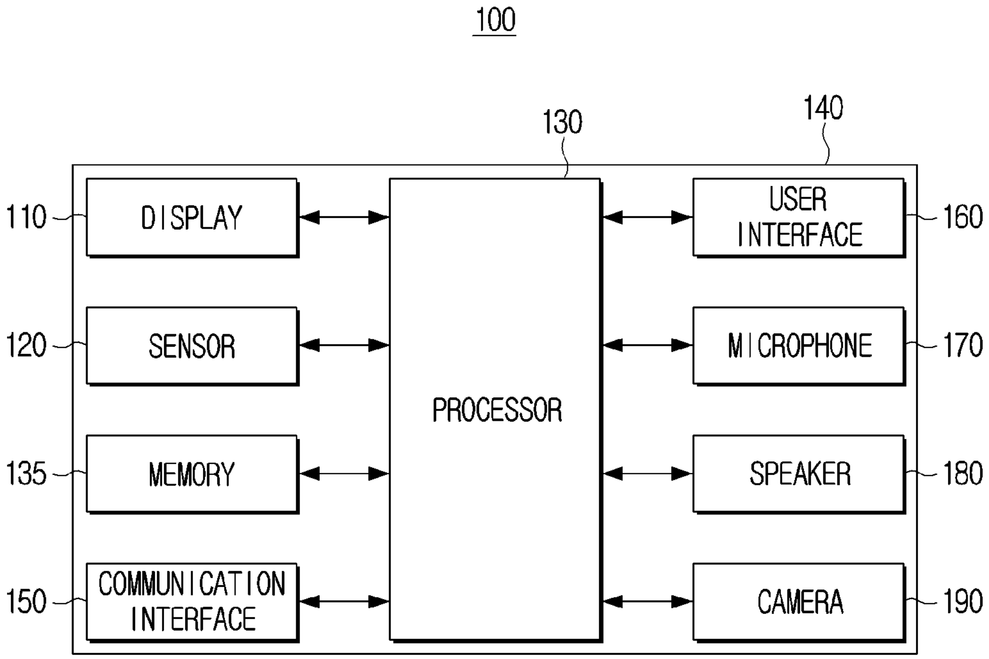
FIG. 2 is a block diagram illustrating a detailed configuration of a display apparatus according to one or more embodiments of the disclosure.

FIG. 2 is a block diagram illustrating a detailed configuration of the display apparatus 100 according to one or more embodiments of the disclosure. The display apparatus 100 may include a display 110, a sensor 120, and a processor 130. Also, according to FIG. 2, the display apparatus 100 may further include a memory 135, a housing 140, a communication interface 150, a user interface 160, a microphone 170, a speaker 180, and a camera 190. Among the components illustrated in FIG. 2, regarding parts that overlap with the components illustrated in FIG. 1, detailed explanation will be omitted.

The memory 135 may refer to hardware that stores information such as data, etc. in an electronic or magnetic form so that the processor 130, etc. can access the data. For this, the memory 135 may be implemented as at least one hardware among a non-volatile memory, a volatile memory, a flash memory, a hard disc drive (HDD) or a solid state drive (SSD), a RAM, a ROM, etc.

In the memory 135, at least one instruction necessary for the operations of the display apparatus 100 or the processor 130 may be stored. Here, the instruction is a code unit instructing the operations of the display apparatus 100 or the processor 130, and it may have been drafted in a machine language that is a language that can be understood by a computer. Alternatively, in the memory 135, a plurality of instructions performing specific tasks of the display apparatus 100 or the processor 130 may be stored as an instruction set.

In the memory 135, data which is information in bit or byte units that can express characters, numbers, images, etc. may be stored. For example, in the memory 135, an image processing model, a holographic resource generating model, an object identifying model, etc. may be stored.

The memory 135 may be accessed by the processor 130, and reading/recording/correction/deletion/update, etc. of instructions, an instruction set, or data may be performed by the processor 130.

The housing 140 may be implemented as a hexahedron, and its inside can be seen through. For example, the housing 140 may be implemented as a transparent material. However, the disclosure is not limited thereto, and the housing 140 may be implemented as a translucent material. Also, the housing 140 may be implemented in various numerous shapes which are not a hexahedron, and it can be in any shape if it is a shape that can include the remaining components of the display apparatus 100.

The communication interface 150 is a component that performs communication with various types of external apparatuses according to various types of communication methods. For example, the display apparatus 100 may perform communication with a server or a user terminal apparatus through the communication interface 150. In this case, the processor 130 may identify the user terminal apparatus carried by the user through the communication interface, and detect access of the user. Also, the processor 130 may change at least one of the location, the size, the luminance, the resolution, or the direction of the object corresponding to the location of the user among the plurality of objects included in the output image based on a user instruction transmitted from the user terminal apparatus.

The communication interface 150 may include a Wi-Fi module, a Bluetooth module, an infrared communication module, and a wireless communication module, etc. Here, each communication module may be implemented in the form of at least one hardware chip.

A Wi-Fi module and a Bluetooth module perform communication by using a Wi-Fi method and a Bluetooth method, respectively. In the case of using a Wi-Fi module or a Bluetooth module, various types of connection information such as an SSID and a session key is transmitted and received first, and connection of communication is performed by using the information, and various types of information can be transmitted and received thereafter. An infrared communication module performs communication according to an infrared Data Association (IrDA) technology of transmitting data to a near field wirelessly by using infrared rays between visible rays and millimeter waves.

A wireless communication module may include at least one communication chip that performs communication according to various wireless communication protocols such as Zigbee, 3rd Generation (3G), 3rd Generation Partnership Project (3GPP), Long Term Evolution (LTE), LTE Advanced (LTE-A), 4th Generation (4G), 5th Generation (5G), etc. other than the aforementioned communication methods.

Alternatively, the communication interface 150 may include a wired communication interface such as an HDMI, a DP, a Thunderbolt, a USB, an RGB, a D-SUB, a DVI, etc.

Other than the above, the communication interface 150 may include at least one of a local area network (LAN) module, an Ethernet module, or a wired communication module performing communication by using a pair cable, a coaxial cable, or an optical fiber cable, etc.

The user interface 160 may be implemented as a button, a touch pad, a mouse, or a keyboard, or as a touch screen that can perform both of a display function and a manipulation input function. Here, a button may be various types of buttons such as a mechanical button, a touch pad, a wheel, etc. formed in any areas such as the front surface part, the side surface part, the rear surface part, etc. of the exterior of the main body of the display apparatus 100.

The microphone 170 is a component for receiving input of a sound and converting the sound into an audio signal. The microphone 170 may be electronically connected with the processor 130, and may receive a sound by control by the processor 130.

For example, the microphone 170 may be formed as an integrated type integrated to the upper side or the front surface direction, the side surface direction, etc. of the display apparatus 100. The processor 130 may detect access of the user through the microphone 170. In particular, in case there are a plurality of microphones 170, the processor 130 may identify the direction wherein the user is located through the plurality of microphones.

The microphone 170 may include various components such as a microphone collecting a sound in an analogue form, an amp circuit amplifying the collected sound, an A/D conversion circuit that samples the amplified sound and converts the sound into a digital signal, a filter circuit that removes noise components from the converted digital signal, etc.

Meanwhile, the microphone 170 may be implemented in the form of a sound sensor, and it can be of any method if it is a component that can collect a sound.

The speaker 180 is a component that outputs not only various kinds of audio data processed at the processor 130, but also various kinds of notification sounds or voice messages.

Other than the above, the display apparatus 100 may further include a camera 190. The camera 190 is a component for photographing a still image or a moving image. The camera 190 may photograph a still image on a specific time point, but it may also photograph still images consecutively.

The camera 190 may photograph a user by photographing the front side of the display apparatus 100. The processor 130 may identify existence of a user, a gesture of a user, etc. from an image photographed through the camera 190.

There may be a plurality of cameras 190. For example, the cameras 190 may be provided as one for each of the front, rear, left, and right sides of the display 110.

The camera 190 includes a lens, a shutter, a diaphragm, a solid imaging element, an analog front end (AFE), and a timing generator (TG). The shutter adjusts the time when a light reflected on a subject enters the camera 190, and the diaphragm adjusts the amount of the light introduced into the lens by mechanically increasing or decreasing the size of the opening through which the light enters. When the light reflected on the subject is accumulated as photo charges, the solid imaging element outputs the phase due to the photo charges as an electronic signal. The TG outputs a timing signal for reading out the pixel data of the solid imaging element, and the AFE samples and digitalizes the electronic signal output from the solid imaging element.

As described above, the display apparatus 100 can update a holographic resource based on existence of a user or a gesture of a user, etc., and thus the user's convenience can be improved.

Hereinafter, the operation of the display apparatus 100 will be described in more detail through FIG. 3 to FIG. 14. In FIG. 3 to FIG. 14, separate embodiments will be described for the convenience of explanation. However, the separate embodiments in FIG. 3 to FIG. 14 may also be implemented in numerous combined states.

Figure 3:
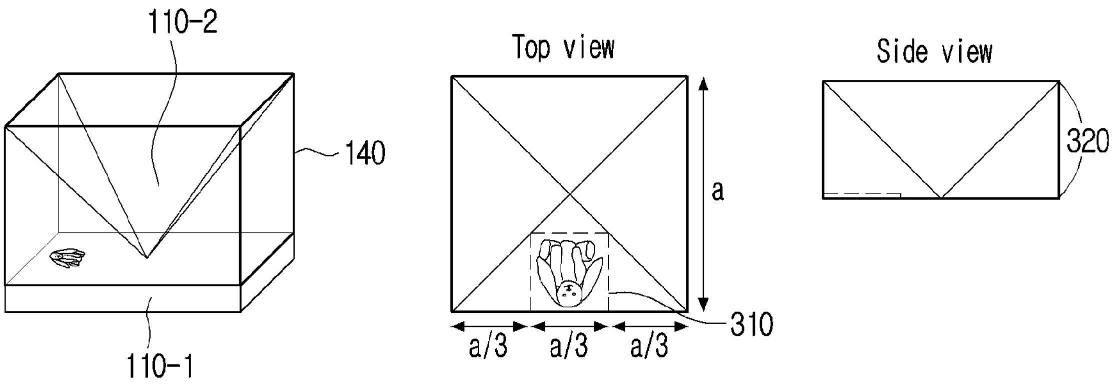
FIG. 3 is a diagram for illustrating a configuration of a display apparatus according to one or more embodiments of the disclosure.

FIG. 3 is a diagram for illustrating a configuration of the display apparatus 100 according to one or more embodiments of the disclosure.

The left side of FIG. 3 is a perspective view of the display apparatus 100, the middle part of FIG. 3 is a diagram that views the display apparatus 100 from the upper (top) side, and the right side of FIG. 3 is a diagram that viewed the display apparatus 100 on one side surface.

As in the left side of FIG. 3, the display apparatus 100 may include a housing 140 implemented as a hexahedron, and the display panel 110-1 may be arranged on the lower surface of the housing 140 and output an image toward the upper side. The plurality of reflectors 110-2 may be arranged in a form of an inverted pyramid on the front surface of the display panel 110-1, and reflect the image output from the display panel 110-1.

On the left side of FIG. 3, the display panel 110-1 displays a rabbit object in a location corresponding to the reflector arranged on the left side among the plurality of reflectors 110-2, and the user may see the rabbit object through the reflector on the left side of the display apparatus 100.

As in the middle part of FIG. 3, the processor 130 may scale the rabbit object 310 to the size of ⅓ of the maximum width (a) of the display panel 110-1 (a/3), and display the object. If the size of the rabbit object 310 is bigger than a/3, a part of the entire area of the rabbit object 310 may not be reflected through the reflector.

The right side of FIG. 3 will be described in FIG. 12.

Figure 4:
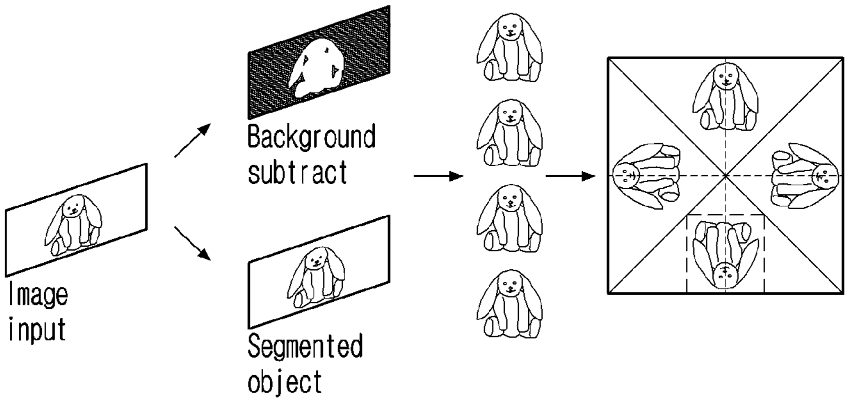
FIG. 4 is a diagram for illustrating an output image according to one or more embodiments of the disclosure.

FIG. 4 is a diagram for illustrating an output image according to one or more embodiments of the disclosure.

The processor 130 may identify an object from an input image, and acquire an output image including a plurality of objects based on the plurality of reflectors.

For example, as illustrated in FIG. 4, the processor 130 may identify a rabbit object from an input image, and separate the rabbit object from the background. Then, the processor 130 may acquire an output image including four rabbit objects based on four reflectors. For example, as described in FIG. 3, the processor 130 may scale the size of the rabbit object to a/3 and acquire a first rabbit object, and rotate the first rabbit object by 90 degrees and acquire a second rabbit object, and rotate the second rabbit object by 90 degrees and acquire a third rabbit object, and rotate the third rabbit object by 90 degrees and acquire a fourth rabbit object. The processor 130 may acquire an output image such that the first to fourth rabbit objects are arranged in locations corresponding to the plurality of reflectors as on the right side of FIG. 4.

The processor 130 may acquire an output image such that the upper part of an object is toward the closest rim among the four rims of the display panel. For example, in the right side drawing in FIG. 4, the head of the rabbit object on the lower side may be arranged to be toward the rim on the lower side among the four rims of the display panel. Accordingly, in the right side drawing in FIG. 4, the rabbit object on the lower side may be reflected in a form wherein the head of the rabbit object is toward the upper side through the corresponding reflector.

The processor 130 may replace the background area which is the remaining area excluding the object area in the output image with a black color. Alternatively, the processor 130 may acquire an output image by a method of arranging a plurality of objects in the output image which is entirely black. Here, the processor 130 may improve the holographic effect by blurring the rim parts of the background area. Alternatively, in the case of a background having no directivity, the processor 130 may not replace the background area by a black color.

Figure 5:
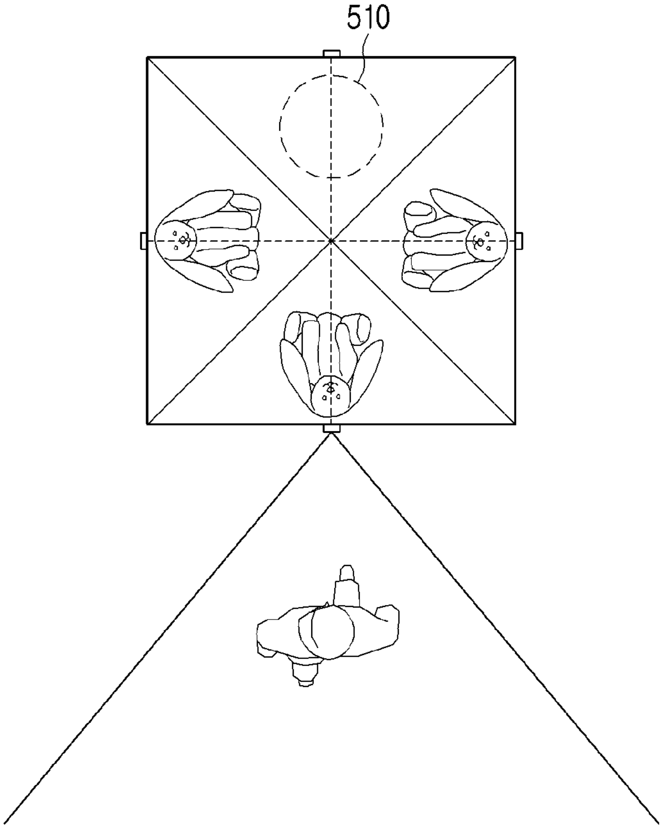
FIG. 5 is a diagram for illustrating an output image according to whether a user is identified according to one or more embodiments of the disclosure.

FIG. 5 is a diagram for illustrating an output image according to whether a user is identified according to one or more embodiments of the disclosure.

The processor 130 may acquire an output image such that four objects are arranged in locations respectively corresponding to the four reflectors, and control the display panel to display the output image. When a user is identified through the sensor 120, the processor 130 may update the output image by removing one of the plurality of objects included in the output image based on the direction wherein the user was identified, and control the display panel to display the updated output image.

For example, as illustrated in FIG. 5, the processor 130 may acquire an output image such that four rabbit objects are arranged in locations respectively corresponding to the four reflectors, control the display panel to display the output image, and when a user is identified through the sensor 120, the processor 130 may update the output image by removing the rabbit object 510 arranged in the upper direction among the plurality of objects included in the output image based on the lower direction wherein the user was identified, and control the display panel to display the updated output image.

In case the rabbit object 510 arranged in the upper direction is not removed, as the reflector arranged in the lower direction is translucent, the rabbit object arranged in the lower direction and the rabbit object 510 arranged in the upper direction may seem to be overlapped to the user. Here, the rabbit object arranged in the lower direction and the rabbit object 510 arranged in the upper direction are in bilateral symmetry, and due to the difference in the distance between the reflector arranged in the lower direction and the reflector arranged in the upper direction, the sizes of the rabbit object arranged in the lower direction and the rabbit object 510 arranged in the upper direction may also be different. That is, visibility for the user may become very low. Accordingly, the processor 130 may improve visibility for the user by removing the rabbit object 510 arranged in the upper direction that is far away from the user.

After removing the object, the processor 130 may update the area of the removed object to the same color as the background. Alternatively, in case the background is not black, the processor 130 may remove the object, and then update the area of the removed object to black. Through such operations, visibility for the user can be improved.

Figure 6:
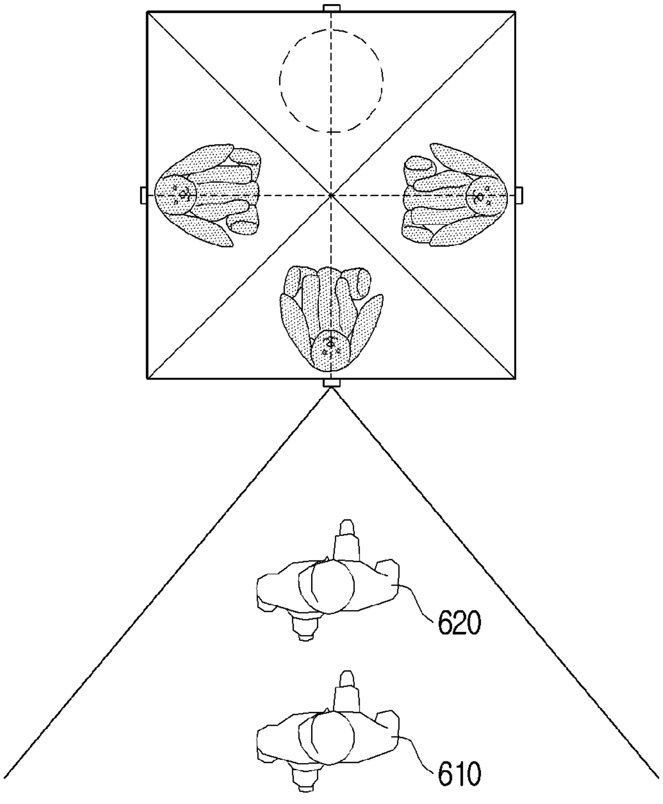
FIG. 6 is a diagram for illustrating an operation according to a distance between a user and a display apparatus according to one or more embodiments of the disclosure.

FIG. 6 is a diagram for illustrating an operation according to a distance between a user and the display apparatus 100 according to one or more embodiments of the disclosure.

The processor 130 may update the output image by changing at least one of the sizes or the resolutions of the plurality of objects included in the output image based on the distance between the user and the display apparatus 100.

For example, in case the user was staying in the location 610 and moved to the location 620, the processor 130 may reduce the sizes and decrease the resolutions of the plurality of objects included in the output image, and in case the user was staying in the location 620 and moved to the location 610, the processor 130 may enlarge the sizes and increase the resolutions of the plurality of objects included in the output image.

Alternatively, in case the user was staying in the location 620 and moved to the location 610, the processor 130 may reduce the sizes and decrease the resolutions of the plurality of objects included in the output image, and in case the user was staying in the location 610 and moved to the location 620, the processor 130 may enlarge the sizes and increase the resolutions of the plurality of objects included in the output image.

The processor 130 may determine an operation according to a distance based on the type of an object. For example, in case an object is an object for the purpose of promotion, the processor 130 may enlarge the size and increase the resolution of the object as the distance increases, so that the user can see the object in case the user is far away from the display apparatus 100. Alternatively, if an object is not an object for the purpose of promotion, the processor 130 may identify that the user is not interested in case the user is far away from the display apparatus 100, and reduce the size and decrease the resolution of the object as the distance increases.

The processor 130 may change the luminance of the plurality of objects included in the output image based on the distance between the user and the display apparatus 100. For example, in case the distance between the user and the display apparatus 100 decreases, the processor 130 may increase the luminance of the plurality of objects included in the output image, and in case the distance between the user and the display apparatus 100 increases, the processor 130 may decrease the luminance of the plurality of objects included in the output image. Through such operations, power consumption can be saved.

Figure 7:
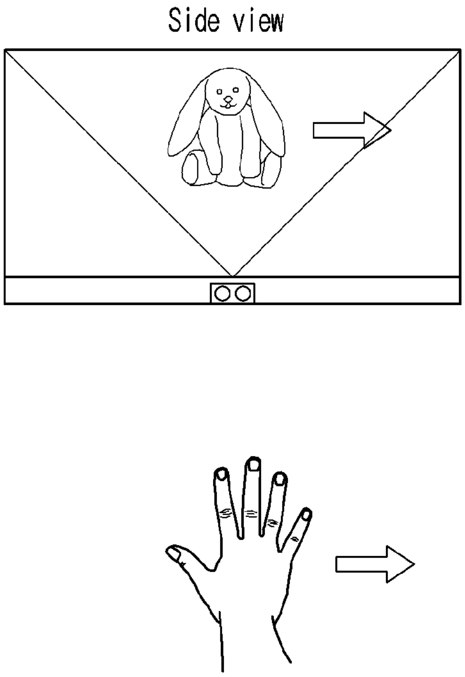
FIG. 7 to FIG. 9 are diagrams for illustrating an operation according to a gesture according to one or more embodiments of the disclosure.
Figure 8:
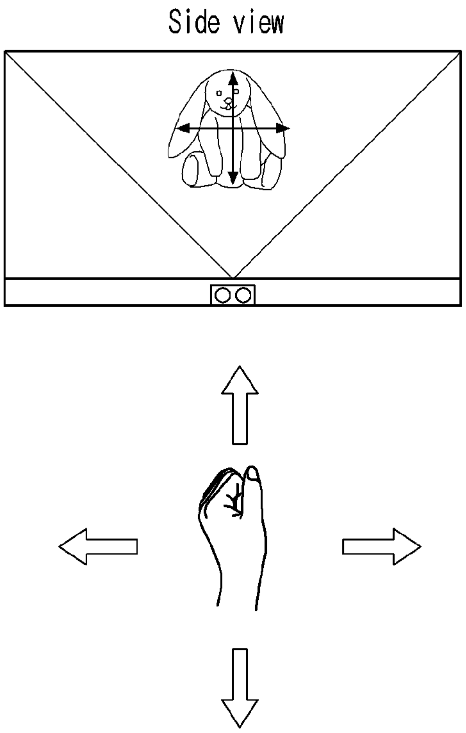
Figure 9:
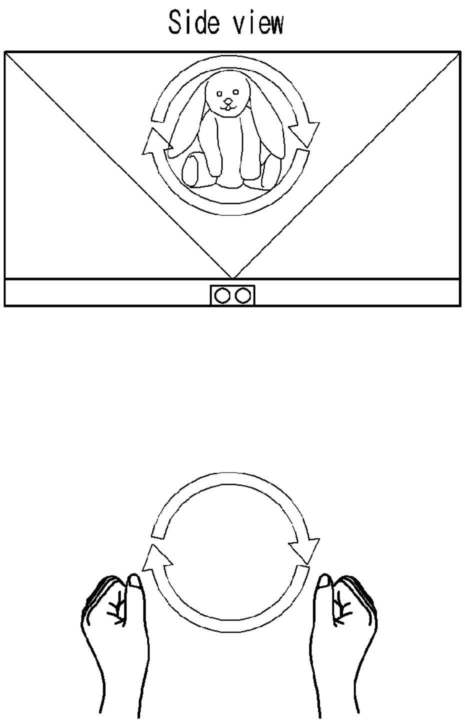

FIG. 7 to FIG. 9 are diagrams for illustrating an operation according to a gesture according to one or more embodiments of the disclosure.

If a swipe gesture or a gesture of moving after a grab of the user is identified through the sensor 120, the processor 130 may update the output image by changing the location of an object corresponding to the location of the user among the plurality of objects included in the output image based on the direction of the gesture.

For example, as illustrated in FIG. 7, if a swipe gesture toward the right side of the user is identified through the sensor 120, the processor 130 may update the output image by moving the location of the object corresponding to the location of the user among the plurality of objects included in the output image to the right side. Alternatively, if a swipe gesture of greater than or equal to a predetermined speed is identified through the sensor 120, the processor 130 may update the output image by removing the plurality of objects included in the output image or changing them to other objects. Alternatively, as illustrated in FIG. 8, if a gesture of moving to one of the upper, lower, left, and right sides after a grab of the user is identified through the sensor 120, the processor 130 may update the output image by moving the location of the object corresponding to the location of the user among the plurality of objects included in the output image to the direction of the gesture. Alternatively, if a gesture of moving to the front side or the rear side after a grab of the user is identified through the sensor 120, the processor 130 may update the output image by reducing or enlarging the size of the object corresponding to the location of the user among the plurality of objects included in the output image.

The processor 130 may also identify the user's two hands through the sensor 120, and update the output image by rotating the object corresponding to the location of the user among the plurality of objects included in the output image based on the rotating direction of the two hands.

For example, as illustrated in FIG. 9, the processor 130 may identify that the user's two hands rotate in a clockwise direction, and update the output image by rotating the object corresponding to the location of the user among the plurality of objects included in the output image in a clockwise direction.

However, the disclosure is not limited thereto, and the processor 130 may update the output image from numerous various user gestures. Also, the processor 130 may not only update the object corresponding to the location of the user among the plurality of objects included in the output image, but may also update the plurality of entire objects included in the output image based on a user gesture.

Figure 10:
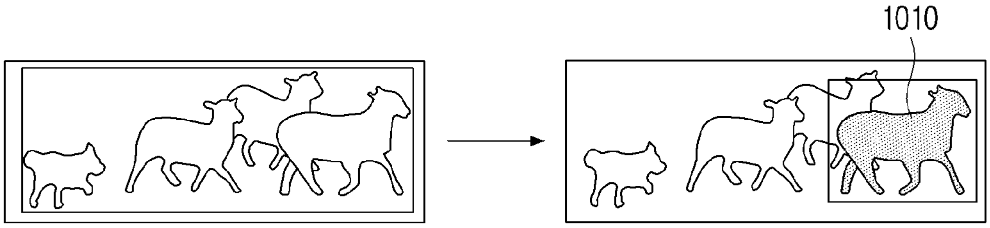
FIG. 10 and FIG. 11 are diagrams for illustrating an operation in case a plurality of objects were identified from an input image according to one or more embodiments of the disclosure.
Figure 11:
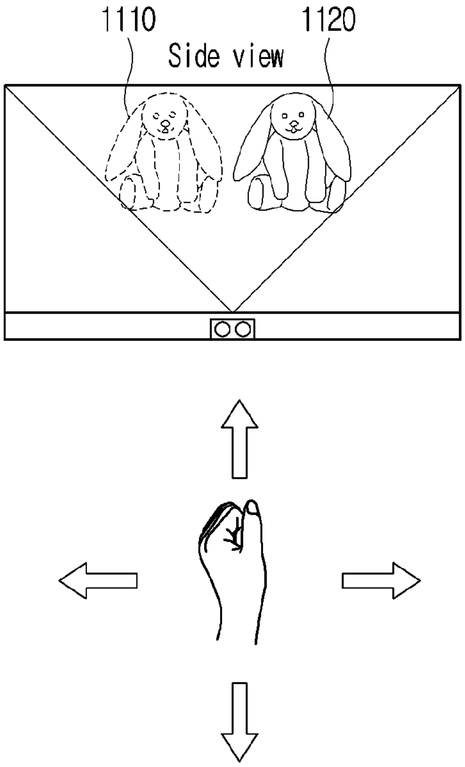

FIG. 10 and FIG. 11 are diagrams for illustrating an operation in case a plurality of objects were identified from an input image according to one or more embodiments of the disclosure.

If a plurality of objects are identified from an input image, the processor 130 may identify the objects based on the sizes of the plurality of objects. For example, as illustrated in FIG. 10, if a plurality of objects are identified, the processor 130 may identify the biggest object 1010, and acquire an output image including the plurality of the identified object based on the plurality of reflectors.

Alternatively, if a plurality of objects are identified from an input image, the processor 130 may acquire an output image including a plurality of images including the plurality of objects based on the plurality of reflectors, and control the display panel to display the output image. For example, as illustrated in FIG. 11, if two rabbit objects 1110, 1120 are identified from an input image, the processor 130 may acquire an output image including four images including the two rabbit objects 1110, 1120 based on the four reflectors, and control the display panel to display the output image. That is, in this case, the output image may include eight rabbit objects.

If a user instruction selecting one of the plurality of objects is received, the processor 130 may control the display panel to add a focus to a rim of an object corresponding to the user instruction among the plurality of objects or flicker the object corresponding to the user instruction, and if the user's gesture is identified through the sensor 120, the processor 130 may update the output image by changing at least one of the location, the size, the luminance, the resolution, or the direction of the object corresponding to the user instruction based on the gesture. For example, as illustrated in FIG. 11, if a user instruction selecting the left side among the two rabbit objects 1110, 1120 is received, the processor 130 may control the display panel to flicker the rabbit object 1110 on the left side, and may thereby guide the user that the rabbit object 1110 on the left side has been designated. Then, if a gesture moving to one of the upper, lower, left, and right sides of the user is identified, the processor 130 may update the output image by moving the location of the object to the moving direction of the gesture.

Figure 12:
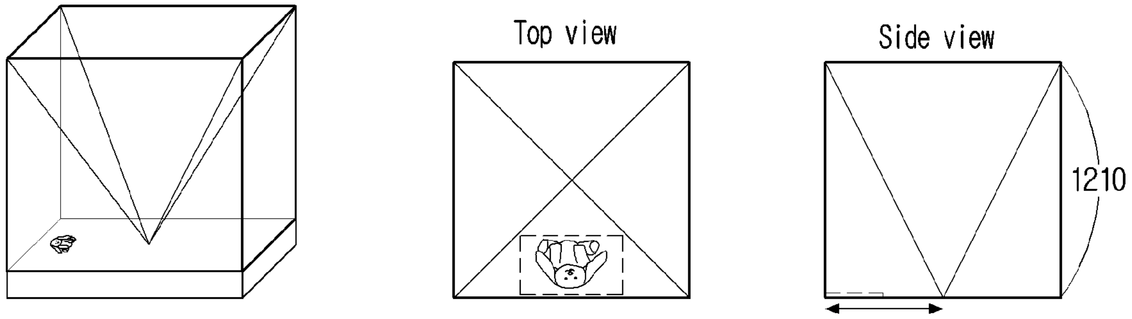
FIG. 12 is a diagram for illustrating scaling of an object according to one or more embodiments of the disclosure.

FIG. 12 is a diagram for illustrating scaling of an object according to one or more embodiments of the disclosure.

The processor 130 may scale a plurality of objects included in an output image based on an angle formed by the plurality of reflectors and the display panel.

For example, as illustrated in FIG. 3, in a case where the height of the display apparatus 100 is the same as the length 320, since the angle formed by the plurality of reflectors and the display panel is 45 degrees, the processor 130 may scale the object so that the horizontal length:vertical length of the object becomes 1:1. Alternatively, as illustrated in FIG. 3, in case the height of the display apparatus 100 is the same as the length 1220, since the angle formed by the plurality of reflectors and the display panel is 60 degrees, the processor 130 may scale the object so that the horizontal length: vertical length of the object becomes 2:1.

Figure 13:
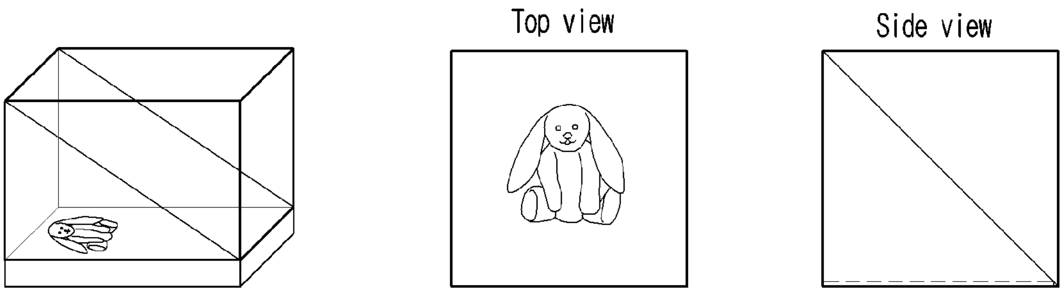
FIG. 13 and FIG. 14 are diagrams for illustrating scaling of an object in case there is one reflector according to one or more embodiments of the disclosure.
Figure 14:
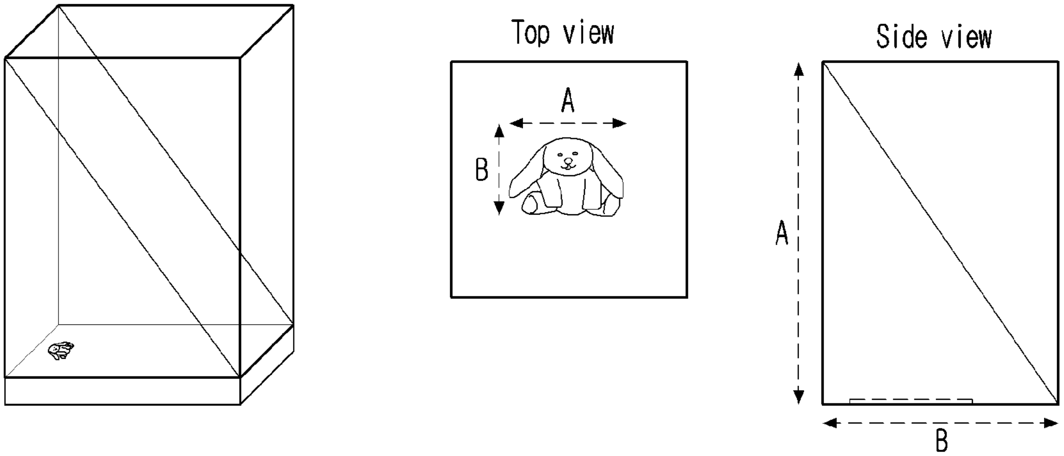

FIG. 13 and FIG. 14 are diagrams for illustrating scaling of an object in case there is one reflector according to one or more embodiments of the disclosure.

As illustrated in FIG. 13, the display apparatus 100 may include one reflector. In this case, the user may see a hologram image only on one side of the display apparatus 100.

The processor 130 may scale an object included in an output image based on the angle formed by the reflector and the display panel.

For example, as illustrated in FIG. 13, in case the angle formed by the reflector and the display panel is 45 degrees, the processor 130 may scale the object so that the horizontal length:vertical length of the object becomes 1:1. Alternatively, as illustrated in FIG. 14, in case the angle formed by the reflector and the display panel is 60 degrees, the processor 130 may scale the object so that the horizontal length:vertical length of the object becomes 2:1.

Here, the ratio of the horizontal length and the vertical length of the object for scaling may be the ratio of the vertical length and the horizontal length of the display apparatus 100 in the side surface view of the display apparatus 100. For example, as illustrated in FIG. 14, in the side surface view of the display apparatus 100, the horizontal length:vertical length of the display apparatus 100 is B:A, and accordingly, the horizontal length:vertical length of the object for scaling may be determined as A:B.

Figure 15:
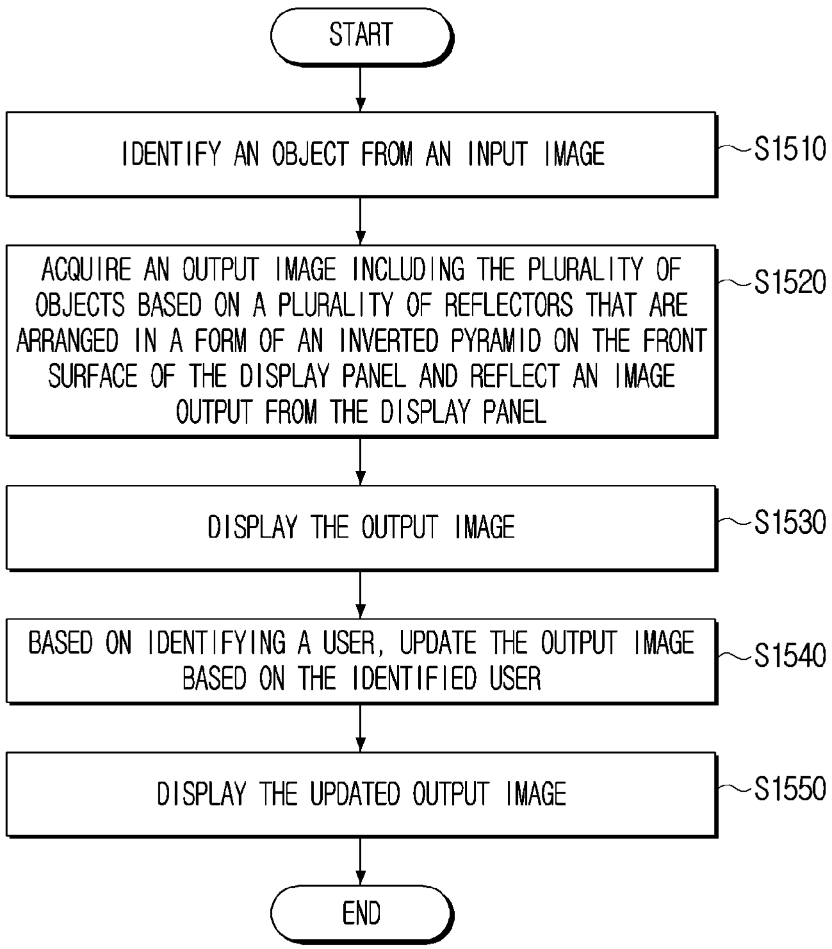
FIG. 15 is a flow chart for illustrating a control method of a display apparatus according to one or more embodiments of the disclosure.

FIG. 15 is a flow chart for illustrating a control method of a display apparatus according to one or more embodiments of the disclosure.

First, an object is identified from an input image in operation S1510. Then, an output image including the plurality of objects is acquired based on a plurality of reflectors that are arranged in a form of an inverted pyramid on the front surface of the display panel and reflect an image output from the display panel in operation S1520. Then, the output image is displayed in operation S1530. Then, if a user is identified, the output image is updated based on the identified user in operation S1540. Then, the updated output image is displayed in operation S1550.

Here, in the acquiring operation S1520, an output image may be acquired so that the objects are arranged in locations corresponding to each of the plurality of reflectors, and in the updating operation S1540, the user may update the output image by removing one of the plurality of objects included in the output image based on the direction wherein the user was identified.

Also, in the updating operation S1540, if the user is identified within a predetermined distance from the display apparatus, the output image may be updated by removing one of the plurality of objects included in the output image based on the direction wherein the user was identified, and the control method may further include the operation of, if the user is not identified within the predetermined distance from the display apparatus while the updated output image is being displayed, re-updating the updated output image by adding the removed object in the updated output image, and displaying the re-updated output image.

Meanwhile, in the updating operation S1540, if it is identified that the gaze of the identified user is toward the display apparatus, the output image may be updated based on the direction wherein the user was identified.

Also, in the updating operation S1540, the output image may be updated by changing at least one of the sizes or the resolutions of the plurality of objects included in the output image based on a distance between the user and the display apparatus.

Here, in the updating operation S1540, the output image may be updated by, if the distance increases, enlarging the sizes and increasing the resolutions of the plurality of objects included in the output image, and if the distance decreases, reducing the sizes and decreasing the resolutions of the plurality of objects included in the output image.

Meanwhile, in the updating operation S1540, if a swipe gesture or a gesture of moving after a grab of the user is identified, the output image may be updated by changing the location of an object corresponding to the location of the user among the plurality of objects included in the output image based on the direction of the gesture.

Herein, in the updating operation S1540, an area of the output image that can be reflected through a reflector corresponding to the location of the user among the plurality of reflectors may be identified, and if the swipe gesture or the gesture of moving after a grab is identified, the output image may be updated by changing the location of the object corresponding to the location of the user within the identified area.

Meanwhile, in the updating operation S1540, the user's two hands may be identified, and the output image may be updated by rotating the object corresponding to the location of the user among the plurality of objects included in the output image based on a rotating direction of the two hands.

Also, in the updating operation S1540, the luminance around the display apparatus may be identified, and the output image may be updated by changing the luminance of the plurality of objects included in the output image based on the identified luminance.

Meanwhile, in the identifying operation S1510, if a plurality of objects are identified from the input image, the object may be identified based on the sizes of the plurality of objects.

Alternatively, in the identifying operation S1510, a plurality of objects may be identified from the input image, and in the acquiring operation S1520, an output image including a plurality of images including the plurality of objects may be acquired based on the plurality of reflectors.

Here, in the operation S1530 of displaying the output image, if a user instruction selecting one of the plurality of objects is received, the output image may be displayed such that a focus is added to a rim of an object corresponding to the user instruction among the plurality of objects or the object corresponding to the user instruction is flickered, and in the updating operation S1540, if the user's gesture is identified, the output image may be updated by changing at least one of the location, the size, the luminance, the resolution, or the direction of the object corresponding to the user instruction based on the gesture.

Meanwhile, in the acquiring operation S1520, the plurality of objects included in the output image may be scaled based on an angle formed by the plurality of reflectors and the display panel.

Here, the plurality of reflectors may be implemented as a translucent material.

Also, the output image may include an object area including a plurality of objects and a background area which is the remaining area excluding the object area, and the background area may be in a black color.

According to the various embodiments of the disclosure as described above, the display apparatus can update a holographic resource based on existence of a user or a gesture of a user, etc., and thus the user's convenience can be improved.

Meanwhile, according to one or more embodiments of the disclosure, the aforementioned various embodiments may be implemented as software including instructions stored in machine-readable storage media, which can be read by machines (e.g., computers). The machines refer to apparatuses that call instructions stored in a storage medium, and can operate according to the called instructions, and the apparatuses may include an electronic apparatus according to the aforementioned embodiments (e.g., an electronic apparatus A). In case an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term "non-transitory" only means that a storage medium does not include signals, and is tangible, but does not indicate whether data is stored in the storage medium semi-permanently or temporarily.

Also, according to one or more embodiments of the disclosure, methods according to the aforementioned various embodiments may be provided while being included in a computer program product. A computer program product refers to a product, and it can be traded between a seller and a buyer. A computer program product can be distributed in the form of a storage medium that is readable by machines (e.g., a compact disc read only memory (CD-ROM)), or distributed on-line through an application store (e.g., Play Store™). In the case of on-line distribution, at least a portion of a computer program product may be stored in a storage medium such as the server of the manufacturer, the server of the application store, and the memory of the relay server at least temporarily, or may be generated temporarily.

In addition, according to one or more embodiments of the disclosure, the aforementioned various embodiments may be implemented in a recording medium that can be read by a computer or an apparatus similar to a computer, by using software, hardware, or a combination thereof. In some cases, the embodiments described in this specification may be implemented as a processor itself. According to implementation by software, the embodiments such as procedures and functions described in this specification may be implemented as separate software modules. Each of the software modules can perform one or more functions and operations described in this specification.

Meanwhile, computer instructions for performing processing operations of an apparatus according to the aforementioned various embodiments may be stored in a non-transitory computer-readable medium. Computer instructions stored in such a non-transitory computer-readable medium make the processing operations at the apparatus according to the aforementioned various embodiments performed by a specific machine, when the instructions are executed by the processor of the specific machine. A non-transitory computer-readable medium refers to a medium that stores data semi-permanently, and is readable by machines, but not a medium that stores data for a short moment such as a register, a cache, and a memory. As specific examples of a non-transitory computer-readable medium, there may be a CD, a DVD, a hard disc, a blue-ray disc, a USB, a memory card, a ROM and the like.

In addition, each of the components (e.g., a module or a program) according to the aforementioned various embodiments may consist of a singular object or a plurality of objects. Also, among the aforementioned corresponding sub components, some sub components may be omitted, or other sub components may be further included in the various embodiments. Alternatively or additionally, some components (e.g., a module or a program) may be integrated as an object, and perform functions performed by each of the components before integration identically or in a similar manner. Further, operations performed by a module, a program, or other components according to the various embodiments may be executed sequentially, in parallel, repetitively, or heuristically. Or, at least some of the operations may be executed in a different order or omitted, or other operations may be added.

Also, while preferred embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Further, it is intended that such modifications are not to be interpreted independently from the technical idea or prospect of the disclosure.

What is claimed is:

1. A display apparatus comprising:

a display panel;

a plurality of reflectors forming an inverted pyramid on a front surface of the display panel, wherein the plurality of reflectors are configured to reflect an image output from the display panel;

a sensor;

at least one memory storing at least one instruction; and at least one processor configured to execute the at least one instruction to, wherein the at least one instruction, when executed by the at least one processor, causes the display apparatus to:

identify an object from an input image, acquire an output image comprising a plurality of objects based on the plurality of reflectors, control the display panel to display the output image, based on identifying a user through the sensor, update the output image and control the display panel to display the updated output image, acquire the output image by arranging, within the output image, a location of each object of the plurality of objects to correspond with a location of a reflector of the plurality of reflectors, and update the output image by removing from the output image an object from the plurality of objects based on a direction corresponding to a location of the identified user.

2. The display apparatus of claim 1, wherein the at least one instruction, when executed by the at least one processor, further causes the display apparatus to:

based on identifying that the identified user is within a predetermined distance from the display apparatus, update the output image by removing from the output image an object from the plurality of objects based on the direction corresponding to the location of the identified user, and based on identifying that the identified user is not within the predetermined distance from the display apparatus and based on the updated output image being displayed by the display panel, acquire a re-updated output image by adding the removed object from the plurality of objects into the updated output image, and control the display panel to display the re-updated output image.

3. The display apparatus of claim 1, wherein the at least one instruction, when executed by the at least one processor, further causes the display apparatus to:

based on identifying that a gaze of the identified user is directed toward the display apparatus, update the output image based on the direction corresponding to the location of the identified user.

4. The display apparatus of claim 1, wherein the at least one instruction, when executed by the at least one processor, further causes the display apparatus to:

update the output image by changing at least one of a size and a resolution of the plurality of objects based on a distance between the identified user and the display apparatus.

5. The display apparatus of claim 1, wherein the at least one instruction, when executed by the at least one processor, further causes the display apparatus to:

based on a distance between the identified user and the display apparatus increasing, update the output image by enlarging a size and increasing a resolution of the plurality of objects, and based on the distance between the identified user and the display apparatus decreasing, reducing the size and decreasing the resolution of the plurality of objects.

6. The display apparatus of claim 1, wherein the at least one instruction, when executed by the at least one processor, further causes the display apparatus to:

based on identifying a gesture of the identified user through the sensor, update the output image by changing the location of an object corresponding to the location of the identified user, among the plurality of objects, based on a direction of the gesture.

7. The display apparatus of claim 6, wherein the at least one instruction, when executed by the at least one processor, further causes the display apparatus to:

identify an area of the output image that can be reflected through a reflector corresponding to the location of the identified user, among the plurality of reflectors, and based on identifying the gesture of the identified user, update the output image by changing the location of the object corresponding to the location of the identified user, among the plurality of objects, within the identified area.

8. The display apparatus of claim 1, wherein the at least one instruction, when executed by the at least one processor, further causes the display apparatus to:

identify a hand of the identified user through the sensor, and update the output image by rotating an object corresponding to the location of the identified user, among the plurality of objects, based on a rotational direction of the hand of the identified user.

9. The display apparatus of claim 1, wherein the at least one instruction, when executed by the at least one processor, further causes the display apparatus to:

identify an ambient luminance in a vicinity of the display apparatus through the sensor, and update the output image by changing a luminance of the plurality of objects based on the identified ambient luminance.

10. The display apparatus of claim 1, wherein the at least one instruction, when executed by the at least one processor, further causes the display apparatus to:

based on identifying a plurality of objects in the input image, identify an object among the plurality of objects identified in the input image based on a size of each object of the plurality of objects identified in the input image.

11. The display apparatus of claim 1, wherein the at least one instruction, when executed by the at least one processor, further causes the display apparatus to:

based on identifying a plurality of objects in the input image, acquire an output image comprising a plurality of images corresponding to the plurality of reflectors, wherein each image of the plurality of images comprises the plurality of objects identified in the input image, and control the display panel to display the output image.

12. The display apparatus of claim 11, wherein the at least one instruction, when executed by the at least one processor, further causes the display apparatus to:

based on receiving a user instruction selecting an object of the plurality of objects identified in the input image, control the display panel to add a focus to a rim of the selected object or cause the selected object to flicker, and based on identifying a user gesture through the sensor, update the output image by changing at least one of a location, a size, a luminance, a resolution, or a direction of the selected object based on the user gesture.

13. The display apparatus of claim 1, wherein the at least one instruction, when executed by the at least one processor, further causes the display apparatus to:

scale the plurality of objects based on an angle formed by the plurality of reflectors and the display panel.

14. A method of controlling a display apparatus, the method comprising:

identifying an object from an input image;

acquiring an output image comprising a plurality of objects based on a plurality of reflectors of the display apparatus forming an inverted pyramid on a front surface of a display panel of the display apparatus, wherein the plurality of reflectors are configured to reflect an image output from the display panel;

displaying the output image on the display panel;

based on identifying a user, updating the output image; and displaying the updated output image on the display panel, wherein the acquiring the output image comprises arranging, within the output image, a location of each object of the plurality of objects to correspond with a location of a reflector of the plurality of reflectors, and wherein the updating the output image comprises removing from the output image an object from the plurality of objects based on a direction corresponding to a location of the identified user.

15. The method of claim 14, further comprising:

based on identifying that the identified user is within a predetermined distance from the display apparatus, updating the output image by removing from the output image an object from the plurality of objects based on the direction corresponding to the location of the identified user; and based on identifying that the identified user is not within the predetermined distance from the display apparatus and based on the updated output image being displayed by the display panel, acquiring a re-updated output image by adding the removed object from the plurality of objects into the updated output image, and controlling the display panel to display the re-updated output image.

16. The method of claim 14, further comprising:

based on identifying that a gaze of the identified user is directed toward the display apparatus, updating the output image based on the direction corresponding to the location of the identified user.

17. The method of claim 14, further comprising: updating the output image by changing at least one of a size and a resolution of the plurality of objects based on a distance between the identified user and the display apparatus.

18. A non-transitory computer readable medium having instructions stored therein, which when executed by at least one processor cause the at least one processor to execute a method of controlling a display apparatus, the method comprising:

identifying an object from an input image;

acquiring an output image comprising a plurality of objects based on a plurality of reflectors of the display apparatus forming an inverted pyramid on a front surface of a display panel of the display apparatus, wherein the plurality of reflectors are configured to reflect an image output from the display panel;

displaying the output image on the display panel;

based on identifying a user, updating the output image; and displaying the updated output image on the display panel, wherein the acquiring the output image comprises arranging, within the output image, a location of each object of the plurality of objects to correspond with a location of a reflector of the plurality of reflectors, and wherein the updating the output image comprises removing from the output image an object from the plurality of objects based on a direction corresponding to a location of the identified user.

* * * * *